June 4, 1968 — E. WILDHABER — 3,386,305

WORM GEARING

Filed April 28, 1966 — 3 Sheets-Sheet 1

INVENTOR:
Ernest Wildhaber

June 4, 1968     E. WILDHABER     3,386,305

WORM GEARING

Filed April 28, 1966     3 Sheets-Sheet 2

INVENTOR:

Ernest Wildhaber

June 4, 1968 E. WILDHABER 3,386,305
WORM GEARING
Filed April 28, 1966 3 Sheets-Sheet 3
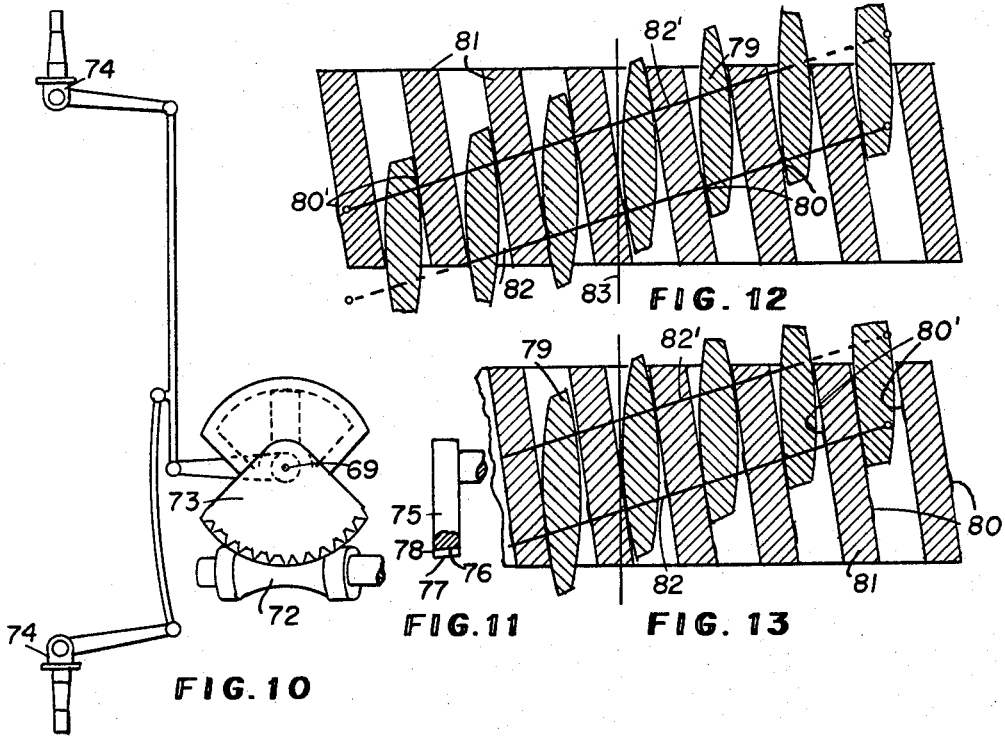
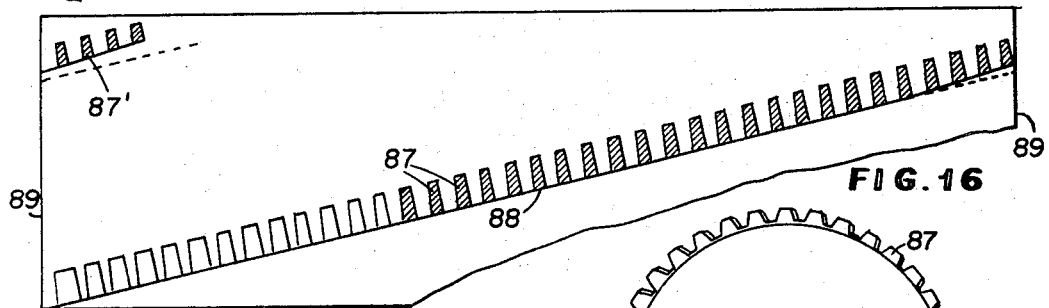
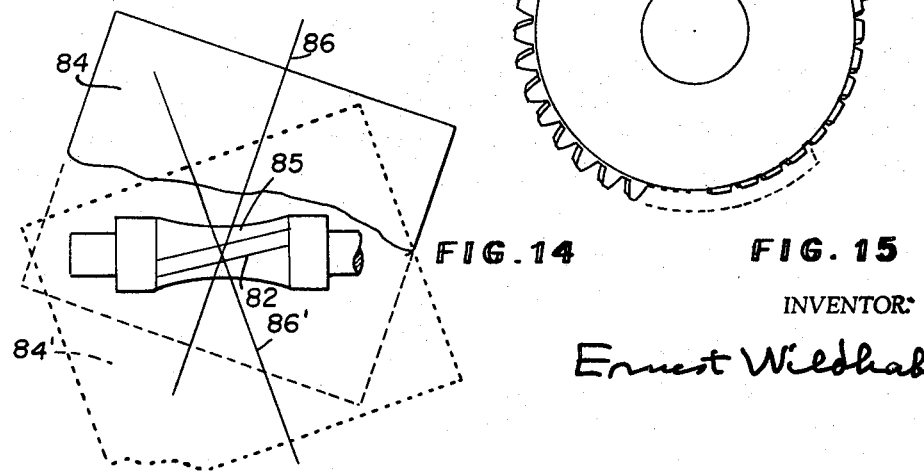
INVENTOR:
Ernest Wildhaber United States Patent Office 3,386,305
Patented June 4, 1968

3,386,305
WORM GEARING
Ernest Wildhaber, Brighton, N.Y.
(124 Summit Drive, Rochester, N.Y. 14620)
Filed Apr. 28, 1966, Ser. No. 546,090
12 Claims. (Cl. 74—425)

ABSTRACT OF THE DISCLOSURE

The invention relates to worm gearing containing an hourglass worm that will mesh at right angles with a helical gear or a spur gear. In a gear pair constructed according to this invention the mesh is inclined to the direction of the worm gear periphery rather than following the periphery. This reduces local heating of the worm gear teeth; and it increases the contact intimacy and load capacity by placing the pitch point outside of the throated outside surface of the worm.

---

The present invention relates to worm gearing in which the wormgear has teeth of constant profile shape in planes perpendicular to the gear axis and the worm has threads or a thread projecting outwardly from a concave root surface. Particularly it relates to worm gearing where the gear has helical teeth or straight teeth and the worm is an hourglass worm.

Such worm gearing has a long duration of contact and is easily assembled.

The known worm gearing of this general type, with the worm set at right angles to the wormgear axis, has however the deficiency that the surface of action extends in the direction of the gear periphery for a long distance. There the tooth contact stays in a fixed position on the gear and does not move over the gear-tooth surface. This tends to produce concentrated heating and wear.

One object of the present invention is to overcome this defect. A further aim is to provide a more intimate contact between the worm and wormgear, thereby to increase the load capacity and the efficiency.

A further aim is to provide a method and a tool for efficiently producing this improved worm gearing.

Other aims will appear in the course of the specification and in the recital of the appended claims.

In the drawings:

FIG. 10 is a diagram showing an application of the worm gearing to vehicle steering.

FIG. 11 is a side view, partly an axial section, of a steering sector such as may be used with this kind of worm gearing.

FIGS. 12 and 13 are fragmentary developments at a larger scale of a mean cylindrical surface coaxial with a steering sector, showing the mesh between the sector teeth and worm threads. The sector teeth have slightly protruding portions or high spots to provide a tight mesh in the mean sector position shown in FIG. 12.

FIG. 13 shows the sector in a different turning position, where the high spots are out of mesh to provide some backlash.

FIG. 14 is a diagram illustrating one way of cutting the worm threads.

FIG. 15 is an axial view of a tool used therein.

FIG. 16 is a development to a plane of a cylindrical surface coaxial with said tool and extending at mid-height through the full-height cutting teeth.

Figure 2:
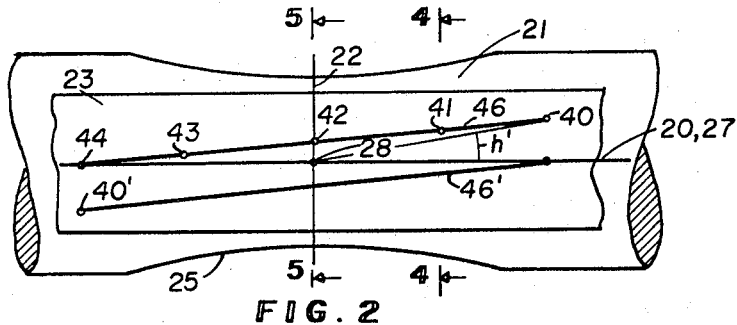
FIG. 2 is a diagrammatic view looking at right angles to both axes of this wormgear pair, showing the path of contact in a mean cylindrical surface 2—2 (FIG. 1) coaxial with the wormgear.
Figure 4:
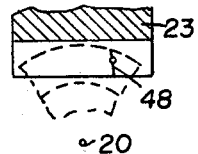
FIG. 4 is a fragmentary section taken approximately along line 4—4 of FIG. 2 along a gear-tooth space, looking in the direction of the arrows.

In the embodiment illustrated in FIGS. 1 to 5 the axis 20 of the hourglass worm 21 is set at right angles to the direction of the axis 22 of the wormgear 23. The wormgear has teeth that extend along helices. These helices show up as straight lines 24 (FIG. 3) in the development of cylindrical surface 2—2 into a plane.

The worm 21 is an hourglass worm. Particularly it has a concave root surface profile in axial sections. Ordinarily but not necessarily it also has an outside surface 25 of concave axial profile. As used here throughout the term hourglass worm means merely a worm with concave root surface profile.

Inasmuch as an axial displacement of the helical wormgear without turning it can bring the gear tooth surfaces into positions coinciding with those attained by turning the wormgear on its axis, the mesh between worm and wormgear is the same as if the wormgear had a rack motion, as if it would move along its axis without turning. This calls for an instantaneous axis 27 of relative motion, where true rolling occurs. Axis 27 is parallel to the worm axis and passes through a pitch point 28 (FIG. 1) on the line of centers 30. At any point of contact the mating surfaces have a common normal that intersects line 27.

On known designs the pitch point is well within the boundaries of the teeth, as at 33.

The instantaneous axis of the substituted rack motion is then a line parallel to the worm axis passing through that point (33). The surface of action contains this line. It extends in the direction of the wormgear periphery in the region adjacent mean point 33. In this region then the tooth contact does not sweep across the gear-tooth surface, but for a time remains in the same position thereon. This tends to cause concentrated local heating and wear.

The invention places the pitch point closer to the gear axis. It lies on the line of centers 30 either at or preferably beyond the outside surface 25 of the worm, as at 28.

The tooth surfaces of the gear are preferably involute helical surfaces, having involute profiles in planes perpendicular to the gear axis. The base circle 36 of these involute profiles may pass through pitch point 28.

At the pitch point the helix angle $h'$ of the extended gear-tooth surfaces matches the inclination of the extended worm thread. This known definition of pitch point results in a helix angle $h'$ according to the formula (1) $$\tan h' = \frac{R}{r} \cdot \frac{n}{N}$$

wherein $r$, $R$ are the radical distances of the pitch point from the worm and gear axes respectively, and $n$, $N$ are the tooth numbers of the worm and gear respectively.

It will now be shown how this displacement of the pitch point to position 28 affects the surface of action and the path of contact in the mean cylindrical surface 2—2.

The surface normals 37 of the involute helical gear teeth are all tangent to the cylindrical surfaces containing base circle 36 and they have a constant inclination ($h'$) to planes perpendicular to the gear axis. With involute gear teeth a fixed surface normal remains a surface normal when the gear turns on its axis. A surface normal at a point of tooth contact intersects line 27 and is an individual path of contact. The surface of action is composed of the surface normals that intersect line 27.

Figure 1:
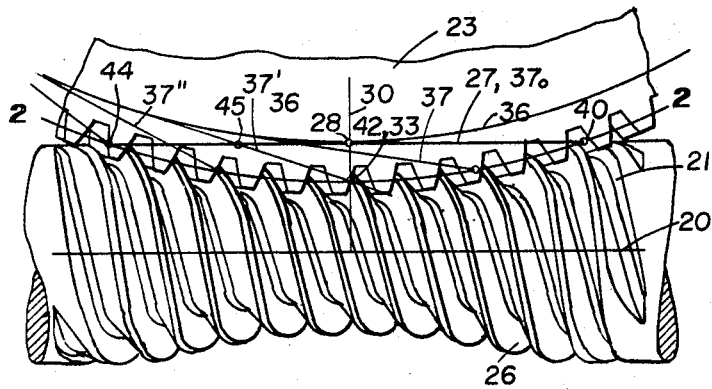
FIG. 1 is a fragmentary view of one embodiment of my invention, looking along the wormgear axis.

Surface normal $37_0$=28—40 appears parallel to the worm axis 20 in projection FIG. 1. It intersects mean cylindrical surface 2—2 at 40. This is a point of the path of contact in surface 2—2. Other points 41, 42, 43, 44 thereof are similarly determined by considering normals 37, 37', 37" etc. Thus normal 37' intersects line 27 at 45 and intersects cylindrical surface 2—2 at 42. Point 44 lies on line 27 itself.

The path of contact 46=40—44 appears approximately straight and inclined to the peripheral direction of the gear. The opposite tooth sides have a path of contact 46'. Paths 46, 46' are shown in development in FIG. 3.

The shown shift of the pitch point has further important benefits. The thread sides contact their gear teeth along lines 48, 48' (FIGS. 4 and 5) that have a large inclination to the gear helices and to the direction of tooth sliding. This inclination varies only moderately along the length of the threads. With the known design it varies much and becomes quite small at one end. And last but not least the pitch point shift to 28 increases the intimacy of tooth contact so that the mating tooth surfaces fall away from one another at a slower rate on both sides of the lines of contact. The relative curvature is smaller. The improvement increases towards the ends 40, 40' of the paths of contact.

Figure 3:
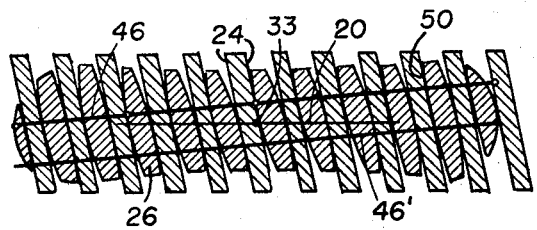
FIG. 3 is a development into a plane of cylindrical surface 2—2, showing the intermeshing teeth therein.
Figure 5:
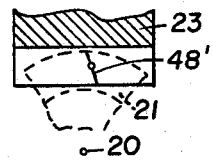
FIG. 5 is a similar section taken along line 5—5 of FIG. 2.

This shows up in FIG. 3 by the increasingly flat intersection curves 50 of the worm thread 25, from left to right in path 46, to the left in path 46'.

*Further embodiment*

Figure 7:
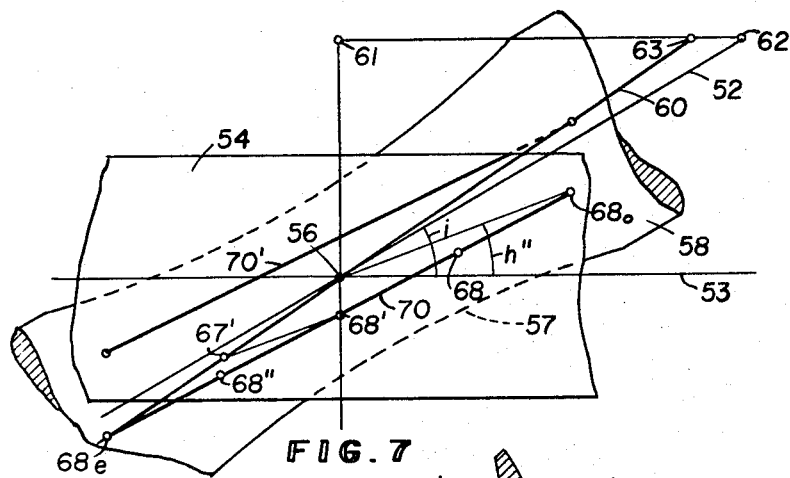
FIG. 7 is a diagrammatic view looking at right angles to both axes of the wormgear pair. It shows the path of contact in a mean cylindrical surface 65 (FIG. 6).
Figures 8, 9:
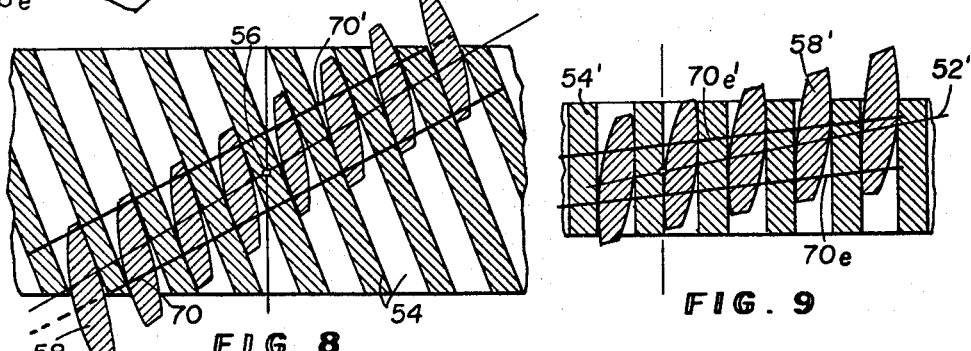
FIG. 8 is a development of this cylindrical surface into a plane, showing the intermeshing teeth in this surface that is coaxial with the wormgear.
FIG. 9 is a similar development illustrating the mesh when the wormgear teeth are straight and parallel to the wormgear axis.
Figure 6:
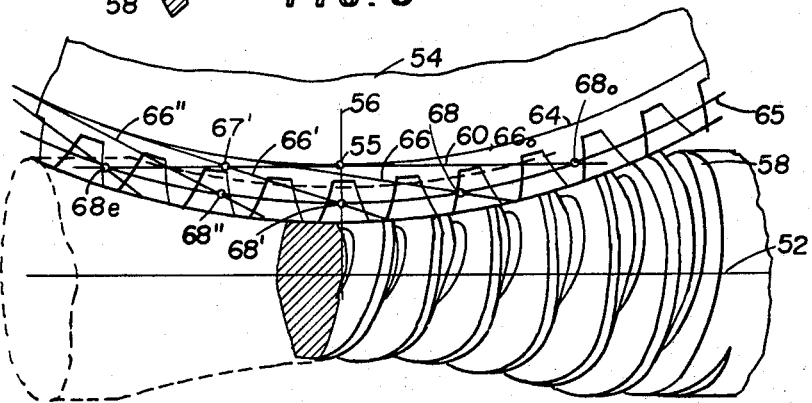
FIG. 6 illustrates a modification of the invention, wherein the worm is set at an acute angle (i) (FIG. 7) to the mid-plane (53) of the wormgear.

In the embodiment shown in FIG. 6 to 8 the worm axis 52 is set at an acute angle to the mid-plane 53 of the wormgear 54. It forms an acute angle with the direction of the gear axis. This modified position inclines the path of contact more to the mid-plane of the gear.

Here again the pitch point (55) lies on the line of centers 56 either at or preferably beyond the outside surface 57 of the worm 58. At the pitch point the helix angle $h''$ of the extended gear-tooth surfaces matches the inclination of the worm thread. It is defined by the following known formula (2)
$$\tan h'' = \frac{\sin i - \tan h'}{\cos i}$$

wherein $i$ denotes the inclination of the worm axis to the mid-plane of the gear (FIG. 7), and $\tan h'$ is given by Formula (1).

Formula (2) results in a helix angle $h''$ smaller than $i$.

A further solution is also possible, where $h''$ is larger than $i$:

(2)a
$$\tan h'' = \frac{\sin i + \tan h'}{\cos i}$$

These angles permit to compute the lead L of the wormgear teeth. Lead L amounts to $2\pi R/\tan h''$ or to $2\pi R/\tan h'$ in the first-described embodiment. The lead L thus is an indication of the position of the pitch point. Another indication are the dual paths of contact.

Even when the worm is set to an angle $i$ the common surface normal at each point of tooth contact intersects a straight line (60) that contains the pitch point and extends in a plane parallel to the worm and wormgear axes. Line 60 is however not parallel to the worm axis. It can be demonstrated mathematically that it may be determined by the following geometric construction:

In FIG. 7 a line 61–62 is drawn parallel to the mid-plane 53 of the wormgear. Let C denote the proportion of length 61–62 to the center distance $(r+R)$; $C=(61-62)/(r+R)$. Then a distance $C \cdot r = 62-63$ is spaced on line 61–62 from point 62, to locate point 63. Then 56–63 is the sought line 60 through which all contact normals pass. Computation may of course be substituted for the geometric construction.

Wormgear 54 may be provided with involute helical tooth surfaces whose involute profiles have a base circle 64 that passes through pitch point 55. The tooth-surface normals have then all a constant inclination to mid-plane 53 and are all tangent to the cylindrical surface containing base circle 64. The surface of action is made up of the surface normals that intersect line 60.

To determine the path of contact in a mean cylindrical surface 65 coaxial with the wormgear we may draw in FIG. 6 various such normals $66_0$, 66, 66', 66" through line 60. Thus normal 66' intersects line 60 at 67'. It is drawn through this point as it appears in projection FIG. 7, locating point 68' at its intersection with cylindrical surface 65. Other points $68_0$, 68, 68", $68_e$ of said path are similarly determined. Path of contact 70 is their connecting line. The path of contact 70' for the opposite tooth sides is determined in like manner. It is seen that the mesh sweeps a large length of the gear teeth.

Here also the contact intimacy is improved by the displacement of the pitch point to position 55. Furthermore the lines of contact between mating tooth sides have a large inclination to the gear helices, an inclination that varies only slightly along the length of the thread sides.

The described mesh refers to fully conjugate teeth without ease-off or crowning. Crowning may be attained by slight modifications, as common in the art. It is preferably applied to the teeth of the wormgear, leaving the worm fully conjugate to and capable of meshing with line contact with a gear that has straight tooth sides in the development of a cylindrical surface coaxial with the gear, with a gear that has helical or straight tooth surfaces.

FIG. 9 refers to a still further embodiment of the invention. It shows the mesh of a spur gear 54' having straight teeth with an hourglass worm 58'. The worm axis 52' is set at an angle to the gear. $70_e$, $70_{e'}$ are the paths of contact of opposite sides of the teeth.

*Application to vehicle steering*

FIG. 10 shows diagrammatically a worm 72 and wormgear 73 of the described character, where the worm is set at an angle of between 8 and 30 degrees to the mid-plane of the wormgear. The wormgear is a sector with approximately vertical axis 69. The turning motion of the sector is transmitted through known linkage means to the two steering knuckles 74. Power steering may be provided by hydraulic pressure applied to a vane rigid with the sector. The sector may be either a portion of a cylindrical gear, or of a tapered gear 75 as shown in FIG. 11. Sector 75 has a tapered root surface 76, and often also a tapered outside surface 77. Its side surfaces extend along helices that converge slightly towards end 78 on opposite sides of a tooth space, so as to permit setting up the worm gearing in tight mesh.

It is often desired to have a tight mesh in the mid-position of the sector and some backlash in the side positions. To this end I may provide high spots 80, 80' (FIG. 12) in the nature of shallow ridges on the gear teeth 81 following the paths of contact 82, 82' between gear teeth 81 and worm threads 79, in the mid-position of the sector. These ridges may stand out one or a very few thousandths of an inch from the main tooth surface. They have different positions on different teeth and extend across the working height of the teeth, like lines 48, 48' of FIGS. 4 and 5.

Numeral 83 denotes the sector axis projected along the line of centers.

FIG. 13 shows the sector displaced from the mean position by three teeth. The ridges 80, 80' are now away from the paths of contact and are out of action. Backlash exists. It remains constant in all sector positions sufficiently away from the mean position.

FIGS. 12 and 13 refer to a cylindrical sector without taper. A tapered sector would show opposite gear-tooth sides that converge slightly toward one tooth end.

Production

FIG. 14 diagrammatically shows a pair of tools 84, 84' for cutting a worm 85 from diametrically opposite sides. They represent a cylindrical wormgear or a sector, and are each rotatable about an axis 86 or 86' set like the wormgear axis with respect to the worm. Each contains cutting teeth 87 (FIGS. 15, 16) that correspond to the wormgear teeth and that are inclined by less than 45 degrees to the direction of the tool axis. The cutting teeth are arranged side by side in a helix 88 (FIG. 16). The helix shows up as a straight line in the development to a plane of a mean cylindrical surface coaxial with the tool. FIG. 16 shows the full circumference of said surface between the lines 89. The inclination of the helix 88 preferably corresponds to that of the paths of contact 82, 82'. But it may also be smaller. In operation, the tool not only rotates but also moves axially, so that during roughing each blade describes the helix 88 which remains fixed in space. The tool and workpiece rotate on their axes at the inverse ratio of their tooth numbers and the tool performs an additional helical motion along the tooth sides of the wormgear.

The cutting teeth 87 gradually increase in height, as best seen in FIG. 15. They cut primarily with their ends 90, which are widest at the start. The initial cutting teeth shown at the left in FIG. 16 are too low to reach into the sectional cylindrical surface shown in development.

The cutting teeth ordinarily occupy more than a single convolution of the helix (88) along which they are arranged. They are relieved. To avoid losing the original cutter diameter through resharpening, cutting teeth 87' are provided near the end. These would project increasingly beyond the desired outside surface if they were sharpened like the other cutting teeth. They are sharpened back to just reach the required outside radius. They start to cut one after the other only after repeated sharpening of the cutter. Cutting edges that are helically moved as described follow the thread sides along their whole length and cut full-length chips off them.

For complete finishing the rate of the added helical tool motion is varied near the end of the operation, so that the finishing edges describe not only the fixed helix 88, but cover an area of moderate width extending to both sides of said helix and following said helix. The worm is completed in one continuous operation.

When the worm is set at right angles to the wormgear axis, the axes 86, 86' are parallel.

The thread sides may be ground with a grinding wheel that represents a tooth side of the wormgear and contacts it from the inside. This wheel performs grinding passes moving in each pass as described for a cutting tool. The worm threads can also be produced by rolling with a pair of tool members (84, 84', FIG. 14) that are shaped like or approximately like the wormgear. Here the principal motion of each tool member is a translation along its axis. To achieve rolling, a helical motion about the wormgear teeth is added when the shaft angle differs from a right angle.

Cylindrical or tapered sectors with ridges may be produced by rolling on a rack whose tooth sides have shallow recesses at the proper places. Cylindrical sectors with ridges may also be produced by broaching, finishing opposite sides of the teeth successively.

While several embodiments of the invention have been described, further modifications may be made in my invention without departing from its spirit, making use of the common knowledge and customary practice of the art. For definition of its scope reliance is placed on the appended claims.

I claim:
1. Worm gearing comprising a wormgear and an hourglass worm meshing therewith, the teeth of said wormgear being approximately straight in a cylindrical section developed into a plane and coaxial with said wormgear, the thread sides of the worm having a changing inclination along their lengths to the direction radial of the worm axis, the pitch point of the mesh having a distance from the worm axis at least as large as the outside radius of said worm at the line of centers.

2. Worm gearing according to claim 1, wherein said wormgear has teeth of involute profile in planes perpendicular to its axis, and wherein said pitch point lies adjacent the base circle of said involute profile.

3. Worm gearing according to claim 2, wherein the pitch point lies on the base circle of the involute gear profile.

4. Worm gearing according to claim 1, wherein the wormgear has helical tooth surfaces of constant lead, and wherein the worm has an outside surface of concave profile in axial section.

5. Worm gearing according to claim 4, wherein the worm is set at right angles to the direction of the wormgear axis.

6. Worm gearing according to claim 1, wherein the worm axis is set at an acute angle to the direction of the wormgear axis.

7. Worm gearing according to claim 6, wherein the teeth of the wormgear are straight and parallel to the wormgear axis.

8. Worm gearing according to claim 1 for vehicle steering, wherein the wormgear is a sector, wherein backlash is provided that varies with the turning angle of said sector and increases from a central sector position with turning angles in either direction, said variation of backlash being contained in the tooth shape of the wormgear and comprising shallow ridges provided on different teeth in different positions, said ridges extending across the working depth of the teeth.

9. Worm gearing according to claim 1 for vehicle steering, wherein the wormgear is a sector, wherein at least the root surface of its teeth is tapered so as to have a larger distance from the sector axis at one end of its teeth than at the opposite end thereof.

10. An hourglass worm conjugate to and capable of meshing with a gear having tooth sides that are straight in a cylindrical section developed into a plane and coaxial with said gear, the pitch point of the mesh having a distance from the worm axis at least as large as the outside radius of said worm at the line of centers.

11. An hourglass worm according to claim 10, wherein the gear to which the worm is conjugate contains helical tooth sides with involute profiles in planes perpendicular to the gear axis.

12. A tool for cutting worms according to claim 10, that represents a conjugate wormgear having straight teeth in a cylindrical section developed into a plane, comprising cutting teeth spaced about the tool axis and being inclined by less than forty-five degrees to the direction of said axis, said cutting teeth being arranged in a helix side by side and occupying more than a single complete convolution thereof, at least part of said cutting teeth having a progressively increasing height.

References Cited

UNITED STATES PATENTS

| 1,759,968 | 5/1930 | Trbojevich | 74—425 |
| 2,885,903 | 5/1959 | Parz | 74—458 |
| 3,079,808 | 3/1963 | Wildhaber | 74—458 |

DONLEY J. STOCKING, *Primary Examiner.*

LEONARD H. GERIN, *Examiner.*